United States Patent
Kopp et al.

(10) Patent No.: US 9,227,495 B2
(45) Date of Patent: Jan. 5, 2016

(54) CABRIOLET TOP WITH CLOSURE UNIT

(71) Applicant: Webasto-Edscha Cabrio GmbH, Stockdorf (DE)

(72) Inventors: Georg Kopp, Plattling (DE); Alexander Haimerl, Bogen (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 70 days.

(21) Appl. No.: 14/019,660

(22) Filed: Sep. 6, 2013

(65) Prior Publication Data
US 2014/0117703 A1 May 1, 2014

(30) Foreign Application Priority Data

Sep. 12, 2012 (DE) .......................... 10 2012 108 531

(51) Int. Cl.
*B60J 7/185* (2006.01)

(52) U.S. Cl.
CPC .............. *B60J 7/185* (2013.01); *B60J 7/1851* (2013.01)

(58) Field of Classification Search
CPC ...... B60J 7/1851; B60J 7/1856; B60J 7/1858; B60J 7/192; B60J 7/185
USPC ..................... 296/121, 122, 107.01, 109, 116
See application file for complete search history.

(56) References Cited

U.S. PATENT DOCUMENTS

| | | | |
|---|---|---|---|
| 5,052,740 A * | 10/1991 | Bauer et al. | 296/120.1 |
| 7,690,716 B2 * | 4/2010 | Dilluvio | 296/107.09 |
| 2003/0146643 A1 * | 8/2003 | Dietl | 296/121 |
| 2004/0021339 A1 * | 2/2004 | Taylor et al. | 296/121 |
| 2004/0094988 A1 * | 5/2004 | Doncov et al. | 296/107.11 |
| 2008/0277975 A1 * | 11/2008 | Biecker et al. | 296/224 |

FOREIGN PATENT DOCUMENTS

| DE | 19927236 C1 | 10/2000 |
|---|---|---|
| DE | 102011103791 A1 | 12/2012 |

* cited by examiner

*Primary Examiner* — Jason S Morrow
*Assistant Examiner* — E Turner Hicks
(74) *Attorney, Agent, or Firm* — Fitch, Even, Tabin & Flannery LLP

(57) ABSTRACT

A cabriolet top having a top linkage which can be adjustable between a closed position, in which it spans a vehicle interior space, and an open position having at both sides of a vertical vehicle longitudinal central plane, in each case one link arrangement assigned a closure unit which can be adjusted by means of an actuating device between a locking and unlocking position and which, in its locking position in the closed position of the top linkage, secures a front bow, which connects the two link arrangements to one another, to a front cowl of the vehicle by means of a locking hook. The locking hook can be connected via a first joint to a first locking link pivotable about an axle fixed to the front bow and via a second joint to a second locking link pivotable about an axle fixed to the front bow.

6 Claims, 6 Drawing Sheets

CABRIOLET TOP WITH CLOSURE UNIT

CROSS REFERENCE

This application designating the United States and claims the benefit of foreign priority from German Patent Application Number 10 2012 108 531.5, filed Sep. 12, 2012, the entire disclosures of which are incorporated herein by reference.

BACKGROUND OF THE INVENTION

The invention relates to a cabriolet of a motor vehicle.

A cabriolet top of said type is known from practice and constitutes a convertible roof of a motor vehicle designed as a cabriolet. Cabriolet tops generally comprise a top linkage which is adjustable between a closed position, in which it spans a vehicle interior space, and an open position, in which it upwardly opens up the vehicle interior space. In the open position, the top is stowed in a rear-end top stowage compartment of the respective motor vehicle. In the case of a top in the form of a so-called soft top, the top linkage serves for tensioning a top material which forms the outer skin of the roof. In the case of a top in the form of a so-called hard top, the top linkage serves for pivoting rigid roof segments which, in the closed position, are arranged one behind the other as viewed in the vehicle longitudinal direction so as to span the vehicle interior space and which, in the open position, are stowed in a stacked manner, or in a manner arranged one above the other, in the rear-end top stowage compartment. The top linkage comprises, at both sides of a vertical vehicle longitudinal central plane, in each case one link arrangement which is mounted on a main bearing fixed with respect to the vehicle and which comprises at least one first, front link or frame element and a second link or frame element which, in the closed position, is arranged toward the rear with respect to the first link or frame element. The front link elements arranged on both sides are connected to one another by means of a front bow, which is commonly also referred to as the roof tip and which forms a rigid roof element. In the closed position of the top, the front bow adjoins a front cowl of the vehicle which delimits a windshield at its upper edge. To secure the front bow to the front cowl, the known top has a closure unit which is adjustable between a locking position and an unlocking position and which, in the closed position of the top linkage, fixes the front bow to the cowl by means of a locking hook which engages on a corresponding locking element which is fixed to the vehicle. Since the locking hook is mounted by means of a single rotary joint, the length of the pulling-closed travel between the front bow and the front cowl is limited. Furthermore, in the case of known closure units for cabriolet tops of the above-described type, there is the disadvantage that a highly cumbersome closure kinematic arrangement is provided, while at the same time a structural space should be kept as small as possible. However, the front bow is often provided, in a central region, with an undesirably large structural height because an electromechanical drive or a hydraulic drive for the closure unit is arranged in this region. The known closure units are often also characterized by a high weight and a multiplicity of individual parts.

SUMMARY

The invention is based on the object of providing a cabriolet top of the generic type specified in the introduction, which cabriolet top has a closure unit for securing the top linkage to a cowl, which closure unit firstly can be integrated in an optimized manner in terms of installation space into the top construction and secondly is of a design which is simple to implement in construction terms and which requires substantially no maintenance.

Said object is achieved according to invention by means of the cabriolet top having a cabriolet top of a motor vehicle, comprising a top linkage which is adjustable between a closed position, in which it spans a vehicle interior space, and an open position, in which it upwardly opens up the vehicle interior space, and which comprises, at both sides of a vertical vehicle longitudinal central plane, in each case one link arrangement which is assigned a closure unit which can be adjusted by means of an actuating device between a locking position and an unlocking position and which, in its locking position in the closed position of the top linkage, secures a front bow, which connects the two link arrangements to one another, to a front cowl of the vehicle by means of a locking hook, wherein the locking hook is connected via a first joint to a first locking link which is pivotable about an axle fixed to the front bow and via a second joint to a second locking link which is pivotable about an axle fixed to the front bow, and wherein the locking hook forms, together with the two locking links, a four-bar mechanism which can be actuated by means of the actuating device.

According to the invention, the locking hook of the closure units which are assigned to in each case one of the link arrangements is a constituent part of a four-bar mechanism. The movement path of the locking hook with respect to the front bow is defined firstly by the geometric configuration of the locking link and the connecting points thereof to the locking hook and secondly by a joint point arranged fixedly with respect to the front bow. Here, the axles of the joints are oriented substantially in the transverse direction of the top, such that the closure units can be integrated into the top linkage in particular in the region of the link arrangements arranged on both sides. The closure units are thus situated, with respect to the vehicle transverse direction, laterally adjacent to a region, which determines the headroom, of the top. As a result, the closure units no longer limit the headroom, determined by the front bow, for occupants of the respective motor vehicle.

In the present case, the expression "front bow" is to be understood in its broadest sense and may consequently be a front-end transverse bow of a folding top or else a front-end rigid roof element of a cabriolet top formed from rigid roof elements.

In a preferred embodiment of the cabriolet top according to the invention, for an optimum actuation of the four-bar mechanism, a gear mechanism is connected upstream of the latter. Said gear mechanism may in particular comprise a coupling link which is connected at one side to the first locking link of the four-bar mechanism and which, at the other side, is articulatedly connected to a diverting lever which is acted on by the actuating device and which is pivotable or rotatable about an axle fixed to the front bow. The actuating device consequently adjusts the diverting lever which is formed for example in the manner of a rocker, wherein the adjusting moment thus exerted on the diverting lever is transmitted by means of the coupling link to the four-bar mechanism.

In one specific embodiment of the cabriolet top according to invention, the coupling link is articulatedly connected to the first locking link such that the longitudinal axis of said locking link, or a joint point between the coupling link and the diverting lever, in the locking position of the closure unit, assumes a beyond-dead-center position with respect to a connecting line between the first joint, that is to say the connecting point of the first locking link on the locking hook, and a pivot axle of the diverting lever, that is to say the articulation point of the diverting lever on a component fixed to the front bow, such that, in the beyond-dead-center position, an adjustment of the closure unit without actuation of the actuating unit is blocked. By means of said measure, it is ensured that an unlocking of the locking hook can take place only by means of the actuating device. For example, thrust forces introduced by the locking hook via the coupling link would then not subject the diverting lever to a torque acting in an opening direction.

To clearly define the locking position or else a maximum end position of the coupling link and/or of the diverting lever in the beyond-dead-center position, provision may be made of a stop for the coupling link and/or of a stop for the diverting lever.

The actuating device for the closure unit is formed in particular by a linearly operating adjusting device. For example, the actuating device is a closure cylinder, which may operate pneumatically or hydraulically, or else an electric motor.

In an alternative embodiment of the cabriolet top according to the invention, no special separate actuating device is provided for the closure unit. Moreover, the actuating device is formed by the top linkage itself. For example, one of the links of the top linkage, which link is driven by means of a main adjusting device of the top which acts on the respective link arrangement, is connected or can be coupled to the diverting lever such that an actuation of the main adjusting device for the opening or closing of the top can also effect an adjustment of the closure unit. Said link then forms the actuating device.

Further advantages and advantageous embodiments of the invention emerge from the description, from the drawing, and from the patent claims.

An exemplary embodiment of a cabriolet top according to the invention is illustrated in schematically simplified form in the drawing and will be explained in more detail in the following description, in which:

DETAILED DESCRIPTION

Figure 1:
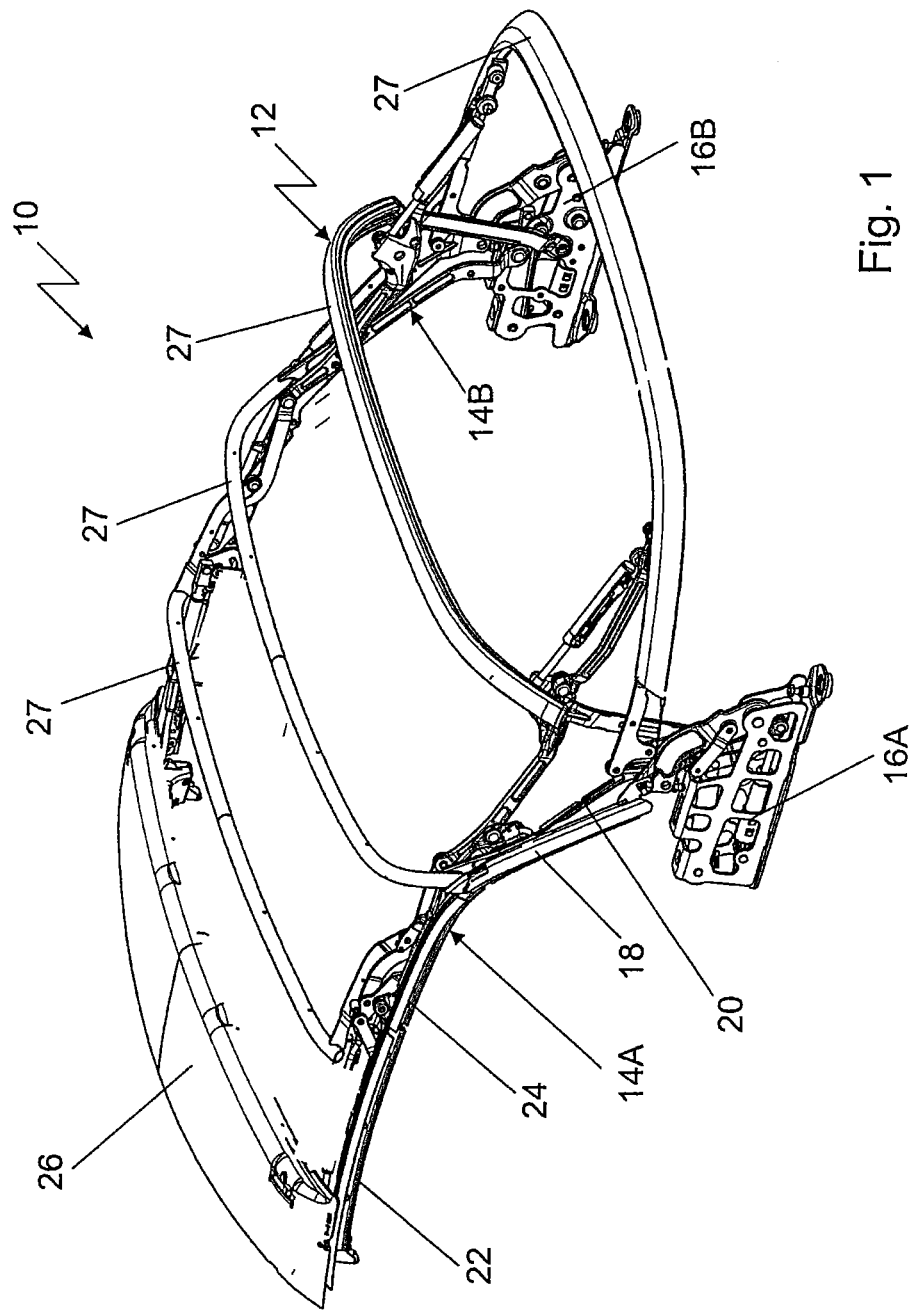
FIG. 1 is a perspective illustration of a top linkage of a cabriolet top according to the invention in a closed position.
Figure 2:
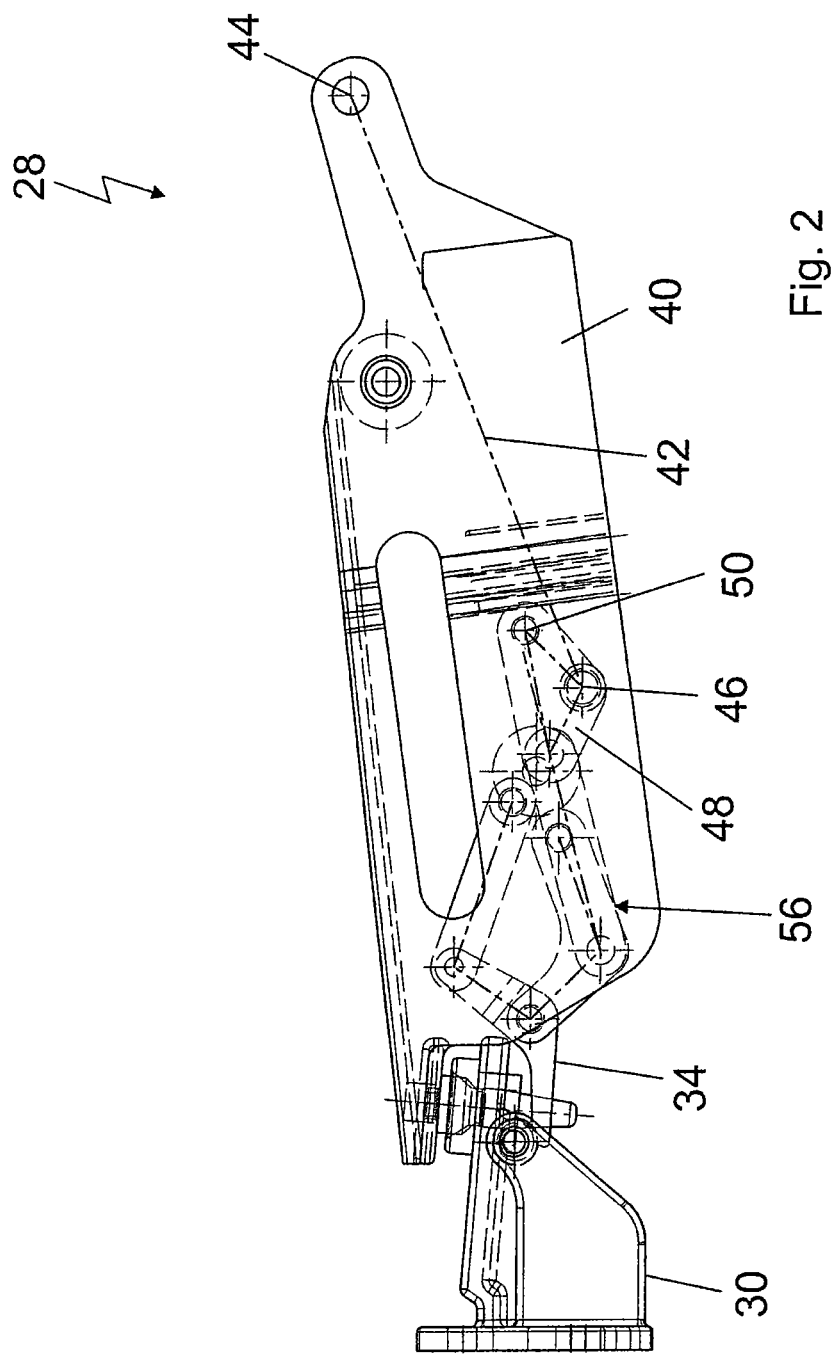
FIG. 2 shows a side view of a closure unit of the top linkage according to FIG. 1 in a position in which it is secured to a front cowl.

The drawing illustrates a convertible roof 10 of a motor vehicle designed as a cabriolet. The convertible roof 10, which consequently forms a cabriolet top, comprises a top linkage 12 which serves for tensioning a top lining formed from a flexible, foldable material, which top lining is not illustrated in any more detail here. The top linkage 12 is adjustable between a closed position, which is illustrated in FIG. 1 and in which the top linkage spans a vehicle interior space of the respective vehicle, and an open position, in which the top linkage upwardly opens up the vehicle interior space and in which said top linkage is stowed in a rear-end top stowage compartment of the vehicle.

The top linkage 12 comprises, at both sides of a vertical vehicle longitudinal central plane, in each case one link arrangement 14A and 14B, these being pivotably mounted on a respective main bearing 16A and 16B mounted fixedly with respect to the vehicle. The link arrangements 14A and 14B are formed mirror-symmetrically with respect to one another about the vertical vehicle longitudinal central plane. For clarity, the following description will be given substantially only on the basis of the link arrangement 14A arranged on the left as viewed in the direction of travel, and may be transferred directly to the link arrangement 14B arranged on the right as viewed in the direction of travel.

The link arrangement 14A, which is pivotably mounted on the main bearing 16A via a main pillar 18 and a main link 20, comprises a first link element 22 which is arranged at the front in the closed position of the top, a central, second link element 24 which is arranged toward the rear with respect to the link element 22 in the closed position of the top, and a rear-end, third link element which is formed by the main pillar 18. The first link element 22, the second link element 24 and the main pillar 18 form three frame elements of the top linkage 12, which delimit the top lining laterally.

The front, first link elements 22, which are arranged at both sides of the vertical vehicle longitudinal central plane, of the two link arrangements 14A and 14B are connected to one another by means of a front bow 26 which constitutes a rigid roof element and which, in the closed position of the top, adjoins a front cowl of the respective vehicle. The two link arrangements 14A and 14B are connected to one another by means of further transverse bows 27 which serve for tensioning the top lining, but which will not be described in detail here.

To be able to secure the top linkage 12 or the front bow 26 in the closed position, the roof 10 has, below the front bow 26 in the region of the two link arrangements 14A and 14B, in each case one closure unit 28 which secures the respective front link element 22 or the front bow 26 to a locking element 30 which is formed on the front cowl and which comprises a locking bolt 32 for a locking hook 34 and a centering opening 36 for the engagement of a centering pin 38 formed on the front bow 26.

The closure unit 28, to which the locking hook 34 is assigned, comprises a closure housing 40 which is arranged rigidly with respect to the front link element 22 and with respect to the front bow 26 and which receives a hydraulically operating adjusting cylinder 42 which is connected, by way of one end, to the closure housing 40 at a joint point 44. At its end remote from the joint point 44, the adjusting cylinder 42 is articulatedly connected via a joint point 46 to a diverting lever 48 which has a substantially triangular form with rounded corners and which is pivotably mounted on the closure housing 40 via a joint point 50 situated in a second corner region. In its third corner region, the diverting lever 48 is articulatedly connected via a joint point 52 to a coupling link 54 via which a torque introduced into the diverting lever can be transmitted to a four-bar mechanism 56. It is self-evidently also conceivable for a closure housing to be dispensed with and for the closure unit to be integrated as an assembly on the front bow without a dedicated housing.

The four-bar mechanism 56 is formed from a first, substantially L-shaped locking link 58, a second, substantially straight locking link 60, and the locking hook 34.

The coupling link 54 is articulatedly connected, by way of its end region remote from the diverting lever 48, via a joint point 74 to the first locking link 58, specifically in the central angled region of said first locking link which separates the control leg 70 from the locking leg 72.

The first locking link 58 is mounted via a joint point 62 on the closure housing 40 and is articulatedly connected via a joint point 64 to the locking hook 34. The second locking link 60 is mounted via a joint point 66 on the closure housing 40 and is connected via a joint point 68 to the locking hook 34. The locking hook 34 likewise has a substantially L-shaped form, as can be seen from FIGS. 2 to 6, wherein the joint point 64 is formed in the region of the transition between the two legs. The joint point 68 is arranged in the region of a leg 70, which constitutes a control leg, of the locking hook 34. The second leg of the locking hook 34 forms a locking leg 72 which interacts with the locking bolt 32.

Figure 3:
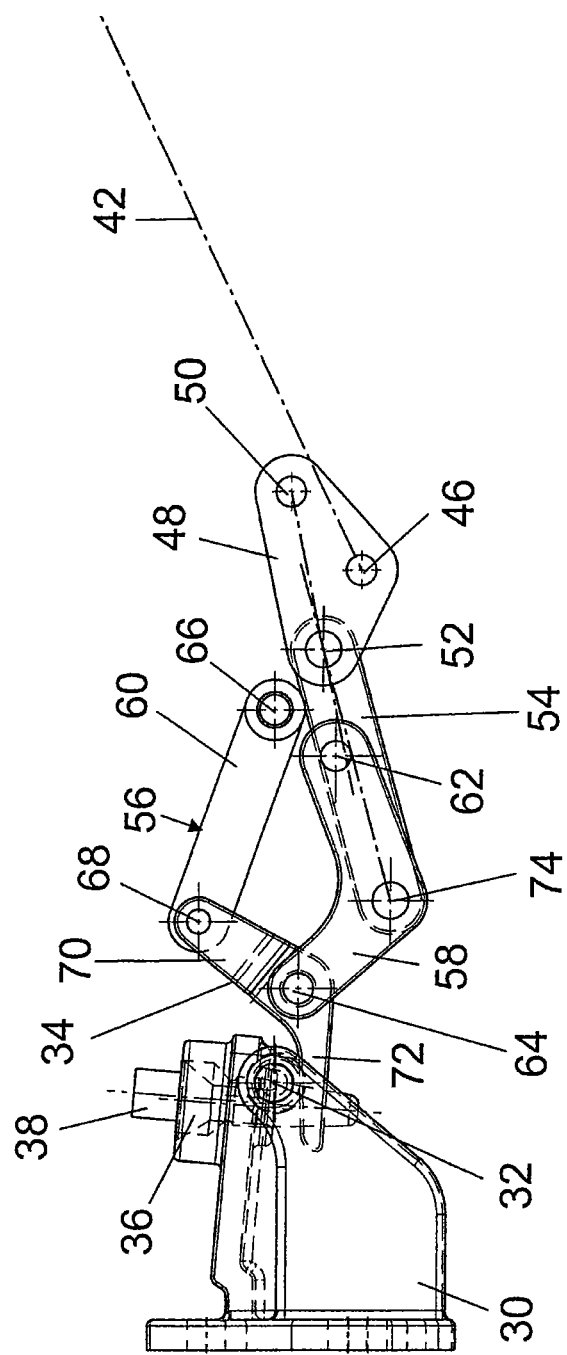
FIG. 3 shows a view corresponding to FIG. 2, but without a closure unit housing.

As can be seen from FIG. 3, in the locking position of the closure unit 28, the axle of the coupling link 54, which extends in the longitudinal direction of the coupling link 54, assumes a beyond-dead-center position with respect to a connecting line between the joint point 74 formed on the first locking link 58 and the joint point 50 of the diverting lever 48, specifically in such a way that the joint point 52 via which the coupling link 54 is articulatedly connected to the diverting lever 48 is in the present case offset in the direction of the second locking link 60 by approximately 2 mm in relation to the joint point 50. An actuation of the four-bar mechanism 56 by thrust forces introduced into the diverting lever 48 via the coupling link 54 is thus blocked. Moreover, the four-bar mechanism 56 can be actuated in the opening direction only by an actuation of the adjusting cylinder 42 which, in the arrangement illustrated in the drawing, rotate the diverting lever 48 counterclockwise.

Figure 4:
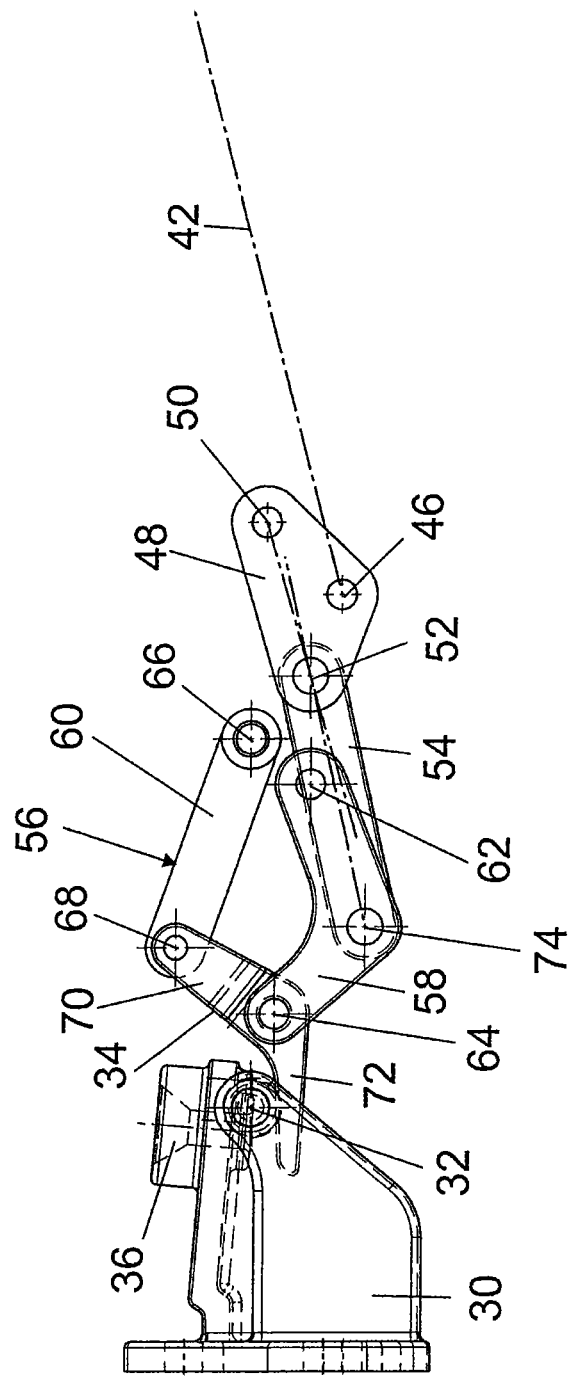
FIG. 4 shows a view corresponding to FIG. 3, with the closing unit unsecured.
Figure 5:
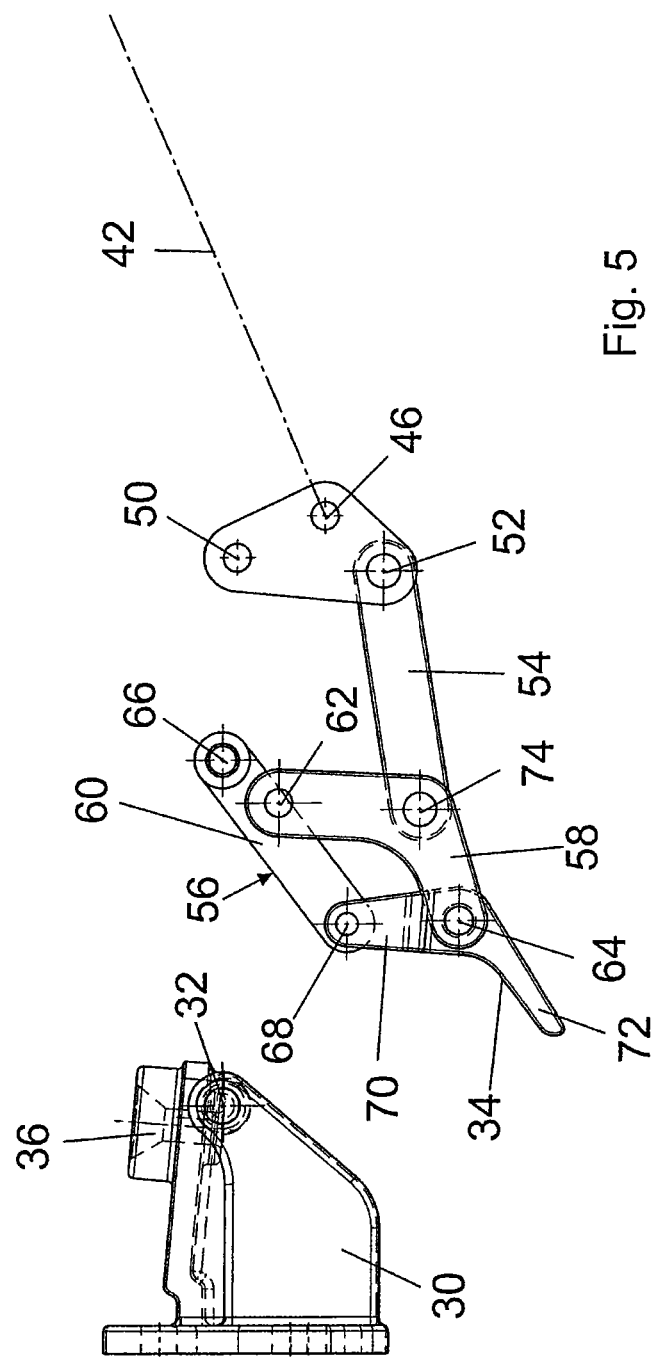
FIG. 5 shows the closure unit in a first opening phase of the top linkage.
Figure 6:
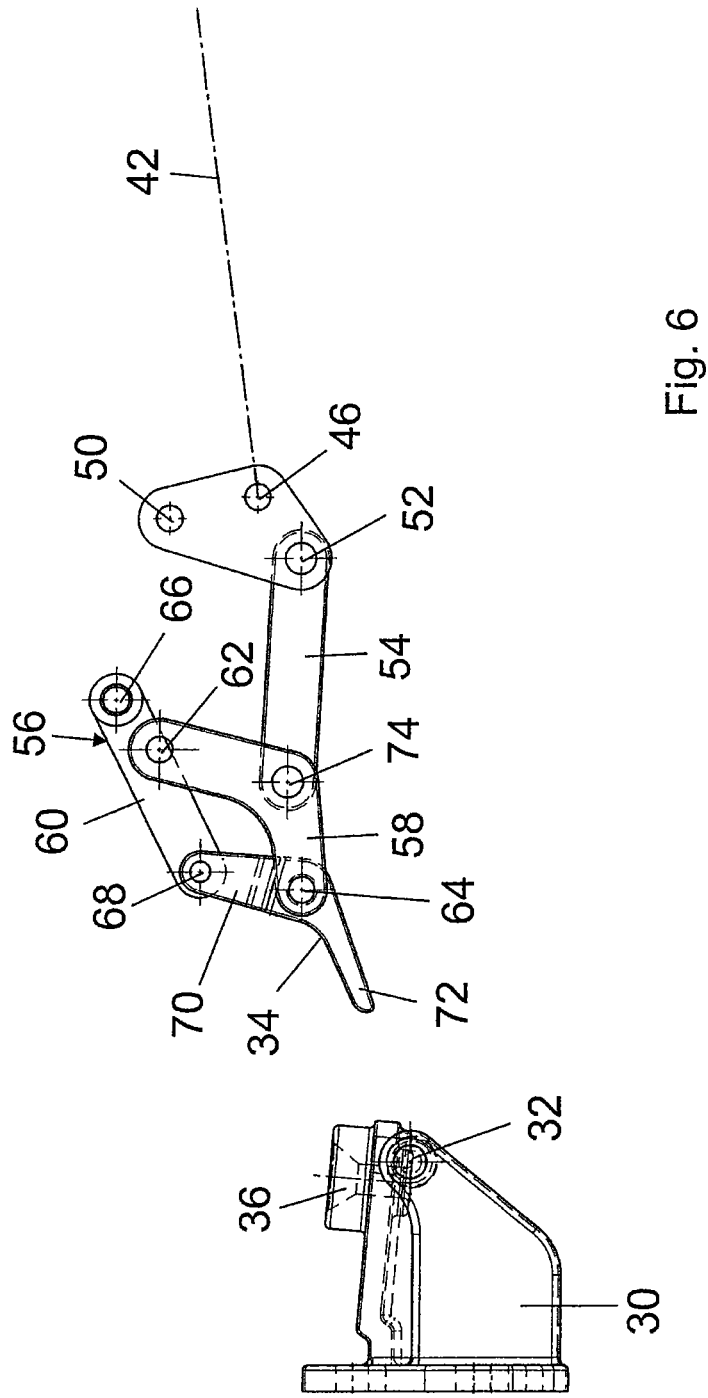
FIG. 6 shows the closure unit in a second opening phase of the top.

As can be seen from FIG. 4, in a first opening phase of the closure unit 28 proceeding from the locking position, by corresponding actuation of the adjusting cylinder 42 and resulting rotation of the diverting lever 48, the beyond-dead-center position is eliminated, that is to say the joint point 52 between the coupling link 54 and the diverting lever 48 is moved, in the direction pointing away from the locking link 60, across the connecting line between the joint points 50 and 74. Subsequently, as a result of a continued pulling action by the adjusting cylinder 42, a tensile force is exerted by the coupling link 54 on the four-bar mechanism 56, such that the locking hook 34 and the locking bolt 32 pass out of engagement, as can be seen from FIG. 5. In a subsequent opening phase, the top linkage 12 can be pivoted past the locking element 30 into the open position (cf. FIG. 6).

The invention claimed is:

1. A cabriolet top of a motor vehicle, comprising a top linkage which is adjustable between a closed position, in which it spans a vehicle interior space, and an open position, in which it upwardly opens up the vehicle interior space, and which comprises, at both sides of a vertical vehicle longitudinal central plane, in each case one link arrangement which is assigned a closure unit which can be adjusted by means of an actuating device between a locking position and an unlocking position and which, in its locking position in the closed position of the top linkage, secures a front bow, which connects the two link arrangements to one another, to a front cowl of the vehicle by means of a locking hook, wherein the locking hook is connected via a first joint to a first locking link which is pivotable about an axle fixed to the front bow and via a second joint to a second locking link which is pivotable about an axle fixed to the front bow, and wherein the locking hook forms, together with the two locking links, a four-bar mechanism which can be actuated by means of the actuating device, wherein, the locking hook and second locking link are pivotable relative to each other via the second joint.

2. The cabriolet top as claimed in claim 1, wherein, to the first locking link, there is connected a coupling link which is articulatedly connected to a diverting lever which is acted on by the actuating device and which is pivotable about an axle fixed to the front bow.

3. The cabriolet top as claimed in claim 2, wherein the coupling link is articulatedly connected to the first locking link such that the longitudinal axis of said coupling link, in the locking position of the closure unit, assumes a beyond-dead-center position with respect to a connecting line between an articulation point of the coupling link on the first locking link and a pivot axle of the diverting lever, it being the case in the beyond-dead-center position that an adjustment of the closure unit proceeding from its locking position without actuation of the actuating device is blocked.

4. The cabriolet top as claimed in claim 3, wherein the coupling link and/or the diverting lever bear and/or bears, in the beyond-dead-center position, against a stop.

5. The cabriolet top as claimed in claim 1, wherein the actuating device is formed by an adjusting cylinder, in particular a hydraulic closure cylinder, or by an electric motor.

6. A cabriolet top of a motor vehicle, comprising a top linkage which is adjustable between a closed position, in which it spans a vehicle interior space, and an open position, in which it upwardly opens up the vehicle interior space, and which comprises, at both sides of a vertical vehicle longitudinal central plane, in each case one link arrangement which is assigned a closure unit which can be adjusted by means of an actuating device between a locking position and an unlocking position and which, in its locking position in the closed position of the top linkage, secures a front bow, which connects the two link arrangements to one another, to a front cowl of the vehicle by means of a locking hook, wherein the locking hook is connected via a first joint to a first locking link which is pivotable about an axle fixed to the front bow and via a second joint to a second locking link which is pivotable about an axle fixed to the front bow, and wherein the locking hook forms, together with the two locking links, a four-bar mechanism which can be actuated by means of the actuating device, wherein the actuating device is formed by a link of the top linkage, which link is driven by means of a main adjusting device of the top.

* * * * *